Figure 1:
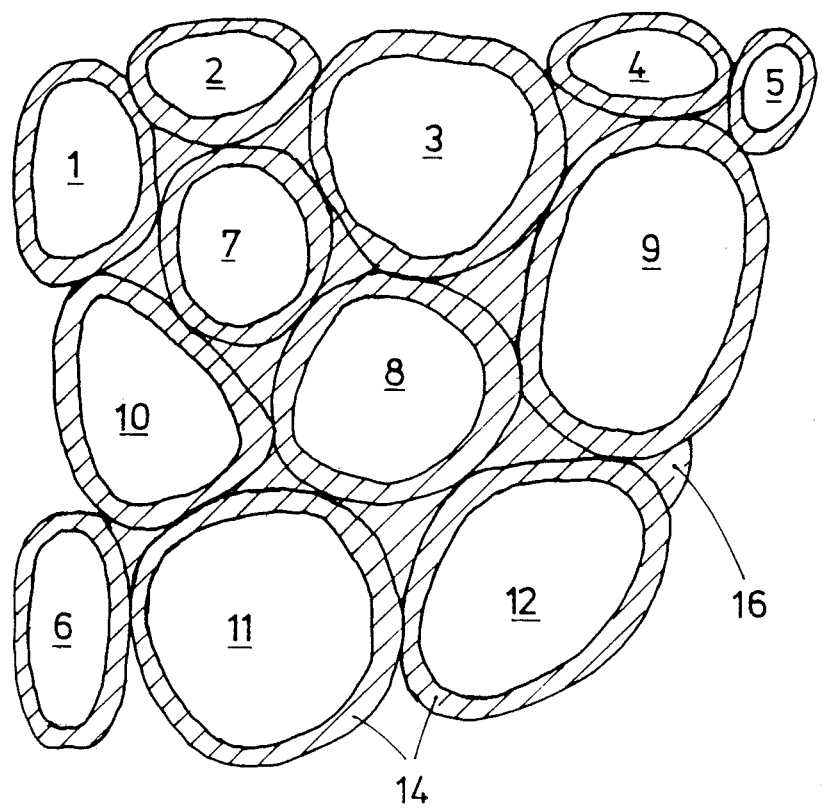

United States Patent [19]

Ziess

[11] Patent Number: 4,978,575
[45] Date of Patent: Dec. 18, 1990

[54] METHOD FOR THE PRODUCTION AND PROCESSING OF REACTANT MIXTURES OF PLASTICS

[76] Inventor: Karl R. Ziess, Feldbergstrasse 24 G, 7800 Freiburg, Fed. Rep. of Germany

[21] Appl. No.: 216,474

[22] Filed: Jul. 8, 1988

[30] Foreign Application Priority Data

Jul. 10, 1987 [DE] Fed. Rep. of Germany ....... 3722897
Oct. 17, 1987 [DE] Fed. Rep. of Germany ....... 3735283
Oct. 19, 1987 [DE] Fed. Rep. of Germany ....... 3735360
Nov. 4, 1987 [DE] Fed. Rep. of Germany ....... 3737413

[51] Int. Cl.$^5$ ............................................. B32B 5/16
[52] U.S. Cl. ........................................ 428/402; 264/5; 264/6; 264/28; 264/45.3; 264/122; 428/407; 428/317.9
[58] Field of Search ...................... 264/45.2, 6, 12, 13, 264/28, 5, 45.3, 49, 122; 428/402, 407, 317.9

[56] References Cited

U.S. PATENT DOCUMENTS 3,110,552 11/1963 Voelker .............................. 264/45.2
3,151,095 9/1964 Stone et al. ............................ 264/28

FOREIGN PATENT DOCUMENTS 0117708 9/1984 European Pat. Off. .

Primary Examiner—Mary Lynn Theisen
Attorney, Agent, or Firm—Larson and Taylor

[57] ABSTRACT

A method is provided for the production and processing of mixtures of pluralities of components based upon reactant synthetic resins, wherein the mixture or at least a part of the components thereof is cooled by addition, and mixing in, of cryogenic liquid gas before or during the subsequent treatment of the mixture until a temperature is reached which allows an essentially dry treatment subsequently. The reactant plastic mixture can be cooled in the liquid state by cryogenic liquid gas to provide granulation or pulverization by cold shock. The mixture can also be cooled by the introduction thereof into a bath of cryogenic liquid gas. The mixture can also be sprayed under pressure, with the sprayed particles then being cooled directly, or indirectly, by cryogenic liquid gas.

9 Claims, 4 Drawing Sheets

METHOD FOR THE PRODUCTION AND PROCESSING OF REACTANT MIXTURES OF PLASTICS

The invention relates to a method for the production and processing of mixtures of a plurality of components based upon reactant plastics.

Mixtures of pluralities of components based upon liquid plastic reactants are used especially and in many ways in construction technology, structural rehabilitation technology and in the protection of structures, but also for instance for the manufacture of porous articles, articles made of reinforced plastics, for instance even by means of the so-called prepregs (i.e., mats or shaped masses of reinforcing fibers impregnated with a thermoplastic resin or a thermosetting resin cured only through an initial stage, ready for molding), as well as also for instance as adhesive for many purposes. The reactant synthetic resins could thus include for instance epoxy, methacrylate, polyurethane or polyester resins. Other components which may be added to these mixtures could be for instance quartz sand, gypsum, perlite, glass fibers or some other special fillers and admixture or flux materials.

To avoid imprecision and nonuniformity of materials under the most difficult conditions found at a construction site, German Offenlegungsschrift No. 34 30 690 teaches mixing the components of a reactant synthetic resin system in the production installation in liquid form, adding filler materials if desired, and stopping the hardening which is instituted by cooling the mixture down to below the relevant reaction temperature of the synthetic resins. In cooled state the mixture could then be stored until the time of use. However this was only an intermediate cooling. For the subsequent treatment the operator in this case also turned from the traditional technology by providing for plastic components to be mixed in liquid state at the construction site, in other words, the intermediately cooled mixture was first heated again to reaction temperature, and normally even to the temperature of the surrounding environment, so that it had the normally viscous and if desired adhesive consistency. If such a mixture is for instance a floor finish, then it could be spread uniformly on the floor only with very great difficulty. Troublesome vapors arise during the processing, which if used in closed spaces with insufficient protective measures could lead to injuries to the health of the operator.

The object of the invention is to provide a method of the aforementioned sort which facilitates a subsequent processing of mixtures with reactant synthetic resins which is in many cases more rapid, better, easier and less injurious to the health.

The primary object according to the invention is attained in that the mixture or at least a part of its components is cooled by the addition of cryogenic liquid gas either before or during its processing, until it reaches a temperature which allows for essentially dry processing.

By the addition of, for instance, liquid nitrogen, the mixture or a part of its components is very rapidly cooled down to a very low temperature, and also, according to the type of cooling process which is utilized, the liquid synthetic resin can be granulated without use of mechanical comminuting tools simply when comminution occurs as a result of the cold shock. In this granular state it is ready for further processing and can thus for instance be easily mixed thoroughly, dosed precisely, distributed over a surface uniformly in a simple manner, filled into hollow spaces or loaded or spread out to enclose or encircle a sheathing or reinforcement. Because of the extensive cooling down by the liquid nitrogen the reaction of the plastics did not take place during those operations or work processes relating to subsequent processing which were better embodied in granular than in liquid state. With this provision, for instance, no damaging vapors arose. As a result of the great difference between the environmental temperature and the temperature of the nitrogen, the plastic coomponents of the mixture required a certain time period before commencement of their reactions. For this purpose the simplified and danger-inhibiting process as described above has been developed and been used for some time.

The plastic mixture or respectively its components could be brought into contact with the liquid nitrogen in various different manners. For instance, it is possible to temper the reactant synthetic resins by application of liquid nitrogen immediately before they are mixed thoroughly with other components of a mixture. This can for instance occur directly at the site of the subsequent processing. Thus for instance reactant plastic and liquid nitrogen could be introduced at the same point, if desired even through one common feed member, into a mixture container for thorough mixing with other components, such as filler materials, propellant charges and so forth. In another practical embodiment the reaction plastics and liquid nitrogen could be sprayed through separate spray nozzles or even through one common mixing nozzle onto filler and/or admixture or flux materials or other mixture components. Then it can be attained that the reactant synthetic resins form quite small, essentially spherical particles, which can be easily thoroughly mixed. A more cost effective and at the same time optimally effective use of the quite expensive synthetic resin components can thus be realized.

Various other practical embodiments of the invention provide that the mixture or at least a part of the reactant synthetic resin be cooled down by flowing into a bath of liquid nitrogen. The granulate which arises therefrom can be collected and if desired sorted and graded by passing through a screen placed directly in the liquid nitrogen. Alternatively, the mixture or at least a part of the reactant synthetic resin components could be cooled by the passage of liquid nitrogen over it. Finally, an indirect cooling is also possible in that the mixture or at least a part of the reactant synthetic resin components could be cooled by contact with a surface which has been cooled by liquid nitrogen or with a fluid which has been cooled by liquid nitrogen.

As aforementioned, the further processing according to the invention can reside in a simple mixing, distribution or dosing process. Thus it is possible to provide a thorough mixing with other cooled, granulate, reactant synthetic resin components or reactant synthetic resin mixtures, which on account of their special physical or chemical properties have not, until this time, been able to be mixed in liquid state. Then if desired a pressing or sintering process can be added to the subsequent processing by thorough mixing.

Independent of this, whether the synthetic resin components reacting with each other before cooling are mixed in liquid state or following cooling are mixed by liquid nitrogen in granular state, the subsequent processing in the sense of the invention can occur in that the mixture which is produced in this manner is mixed together with at least a filler, a reinforcement or a propellant charge. The latter could also already be included in the cooled mixing, so that a foaming process does not take place until after heating.

The production, especially of cold-reactant foams, is now simplified, in that a stirred propellant charge evaporates during the exothermic reaction of the plastic components and so the cells are formed. Thus for the most part propellant charges with for instance chlorinated and fluoridated hydrocarbons of low boiling point are used in the mixture, since the energy which is made available from the low reaction temperature for the evaporation does not allow for the use of higher boiling point liquids. Highly reactant liquid plastics, which cause such a strong exothermic reaction in such a short time, which also leads also to higher boiling point liquids focussed upon the evaporation, could not be used until this time, since they were immiscible and undosable because of their short pot time, i.e., pot life.

The invention henceforth facilitates the use of even highly reactant liquid reactant plastics with a reaction time shorter than 600 seconds, preferably less than 60 seconds, in which propellant charges containing no solvents and having a higher boiling point and with stronger exothermic reaction can also cause the foaming process. Even dispersed water particles can be considered as propellant charges if desired.

Possible uses also remain for the production of plastic parts, especially with reinforcements, for instance in the form of glass fibers or carbon fibers, such as for instance for auto body parts in the automobile industry, which until this time has not been considered to be a use for this material, because it is treated in large scale mass production with very short station times. The manufacture of reinforced plastic parts however until this time has required many hours of delay until the required strength is attained for the subsequent processing. Actually the use of cooled so-called prepregs required long manufacturing times for their production, cooling, heating and processing up to strength for the article to reach the shaped state. Highly reactant liquid plastics which in the shortest time and also in connection with reinforced parts produce a useful strength for the product, could until this time also not be used in this case, since they were immiscible and also undosable because of their short pot time.

Now it is possible, as a result of the invention, to process even highly reactant reaction plastics with short station time per finished product, since the granular or powdered reactant plastics in cooled state are brought into a form so that they are ready to react only when they are in a state in which they can react very rapidly. Thus it is also advantageous that, otherwise than with cooled prepregs, for instance glass fiber mats which also include adhering, cooled reactant plastic powder, are sufficiently flexible for introduction into a mold. Besides the cycle of the process including the processing of the reactant plastics into reinforced mold parts is described as above in connection with the molding process.

One further processing possibility for cooled reactant plastic powder resides in that it may be sprayed electrostatically on articles, so that it is heated there, reacts briefly and forms a coating.

Therefore also the production of sandwich constructions or respectively lamination can be accelerated, and in turn a thin layer of cooled, powdered reactant plastic is introduced between the layers to be bonded together, and even in this case the coating can be applied by means of the spraying process, if desired by electrostatic spraying. A special type of sandwich construction of different types of plastic layers can also be attained in this case, in that a plurality of layers of different reactant plastic particles may be layered one over the other and then brought to reaction.

In all of the processes and products described above the temperature of the mixture should be lowered with cryogenic liquid gas or the mixture components at the beginning of the processing should be at a temperature below $-50$ degrees C., preferably below $-70$ degrees C. In practice, the use of liquid nitrogen as a coolant is preferred. In the individual cases however, it is possible that some other liquid gas, for instance, carbon dioxide, could be used.

Finally, the invention offers the possibility of fashioning porous articles, especially strutural members, construction elements and coatings of plastic and filler materials, which, according to the filler materials which are selected, have the desired properties and additionally have very good strength levels, but contain only a minimum quantity of synthetic resin as binder.

The invention thus makes use of the knowledge that the filler material particles need to be wetted with synthetic resin binder only where they contact the adjacent filler material particles. For this reason a minimum volume of synthetic resin of less than 5% of the filler material volume suffices. Preferably the plastic volume is only a maximum of 3% or is even less than 1.5%.

In this case the plastic bridges between the filler material particles are only very short, so that for instance in the case of very hard mineral filler materials under application of a heavy compression load, the hard particles are propped for all practical purposes directly against one another. On account of the low synthetic resin portion, this embodiment is also very nonflammable.

In other preferred variations of embodiment it is provided that the filler material particles are at least partially made up of fibers, especially such fibers as are suitable for the incorporation of traction forces. Another suggestion of the same sort is that the filler material particles be connected by plastic bridges with a reinforcement or sheathing.

The porous article according to the invention must not be a movable part, but actually can even have the form of a base or wall coating, which for instance may be considered in terms of a street foundation, a railroad track bed or a building foundation. In this case the water permeability for drainage purposes or the breathing activity level of the porosity can be particularly advantageous. Of course the possibility also exists of tightly closing off the outside openings of the pores in case this is desired in certain cases.

In still another preferred practical embodiment the filler material particles are at least partially seeds and/or plant nutrients. Such articles are suitable especially for the floral decoration of edifices.

When a porous article is not to be produced until at a site of difficult access and then only in a small quantities, as is the case for instance with the filling up of tears occuring during structure rehabilitation, a ready-for-use cooled mixture of filler material and reactant synthetic resin particles is recommended for this purpose, and also in this case the synthetic resin volume according to the invention is at the most approximately 5% of the filler material volume. As already explained, according to one possibility, in all the various cases of different uses of the synthetic resin volumes, even at the most only approximately 3% and preferably even a minimum of only approximately 1.5% of the filler material volume is made up of synthetic resin volume. Theoretically, a quantity of less than 1% suffices, when filler material and reactant synthetic resin particles are mixed very uniformly and when care is taken concerning suitable selection of the particle sizes and the parameters of the method during heating of the cooled mixture so that the filler material particles are cemented together only at their contact points by small and smooth plastic bridges.

The portion of synthetic resin in relation to the filler material can be maintained at a low level in a simple manner, in that in the preferred embodiment of the new method the cooled synthetic resin particles are produced having diameters which are at the most approximately one tenth of the largest dimension of the filler material particles.

The suggested method can be executed especially when only the small quantity of synthetic resin is cooled and the filler material is not. When the cooled synthetic resin particles are mixed with the very much larger mass of filler material, then under unfavorable conditions in certain cases it can happen that the synthetic resin particles become too rapidly heated and the required homogenous and thorough mixing can no longer be attained. In order to preclude this, in another preferred configuration of the invention it is suggested that, by treatment with water or water vapor, the cooled synthetic resin particles be coated with a layer of ice. This retards the heating until a uniform thorough mixing is attained and has the further positive effect that the water formed with the melting supports the tendency of the synthetic resin which is being liquefied again with the heating to delay this liquefaction as a result of the capillary effect within the hollow spaces between the filler material particles in the fissures and narrow points, in other words exactly at the contact points of the filler material particles.

No large mechanisms or installations are required for production of the small quantities of synthetic resin as binder of filler material.

Thus the work units are preferably erected directly at the construction site, so that in a preferred embodiment of the above method the cooled synthetic resin particles can be mixed directly with the filler material in the next step of its production and can be heated to reaction temperature. This avoids the requirement for intermediate storage of the synthetic resin in cooled state.

In order to produce particularly high levels of strength, solidity and stability, in another preferred embodiment of the invention the mixture of reactant synthetic resin and filler material can be placed under pressure during hardening and thus can be compressed. In accordance with the elasticity of the filler material and of the plastic then an inner priming stress or potential can also be produced, which can provide a certain direction. For acceleration of the hardening of the reactant synthetic resin the mixture with the filler material can be heated even higher than the surrounding temperature. Especially with porous articles which are produced in molds, as with a sintering process, pressure and heat can be used simultaneously.

The new porous articles with extremely high filler material and extremely low synthetic resin binder portions could be used in many ways. Respiration or breathing active, sound absorbing, fire resistant and heat insulating structural members and coatings are only suggestions for their use. Other uses have already been cited above. Therefore the types of filler materials are to be selected according to the use which is intended. This primarily concerns the low cost of mineral filler materials, such as for instance sand, organic filler materials, such as for instance sawdust or sawmill waste, fibrous filler materials, including for instance glass fibers, and also metal slivers. All of said filler materials can be considered including all of those which have been used for this purpose until this time, only it has always before been with too much synthetic resin, because it was not yet known that merely approximately the tenth part of the synthetic resin quantity used until this time allows the holding strength to be the same or even higher and also porous structural elements and structural materials can be obtained with totally new properties, based on their defined permeability.

Figure 2:
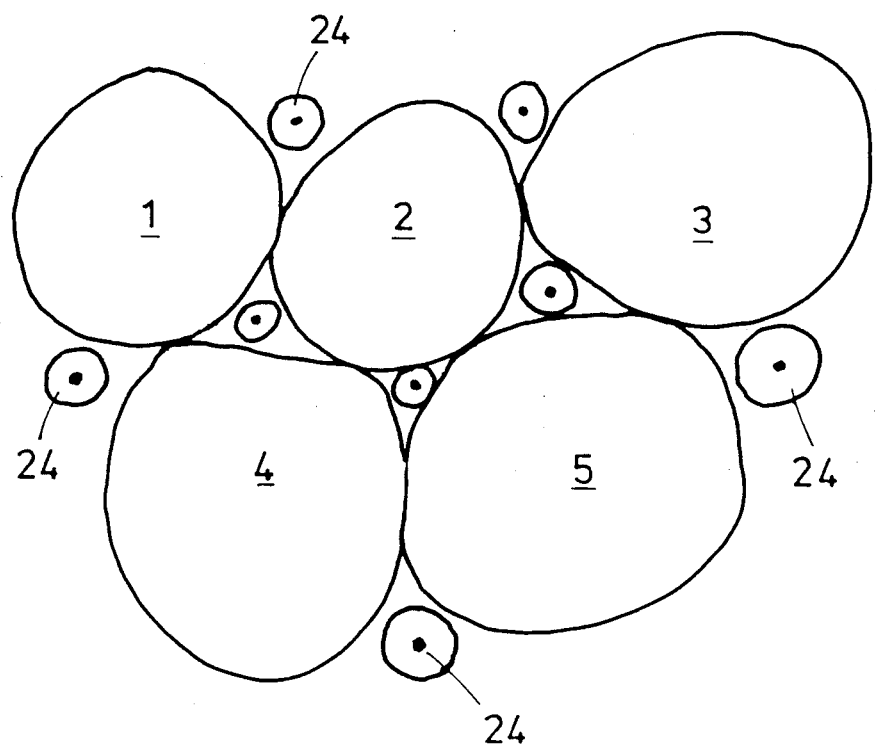
Figure 3:
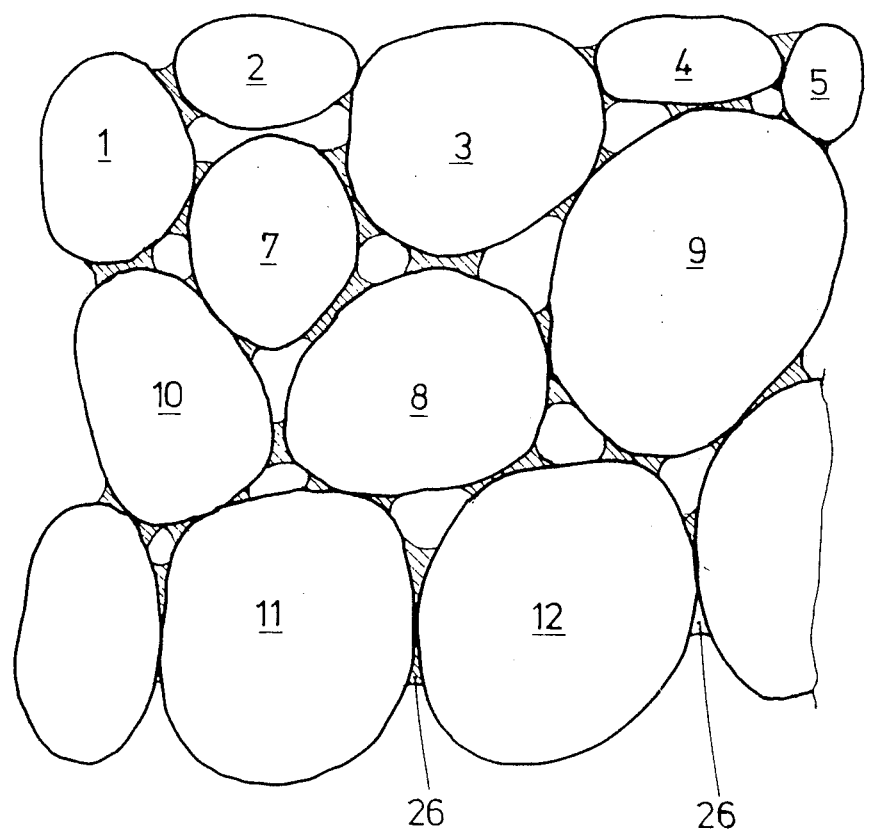
Figure 4:
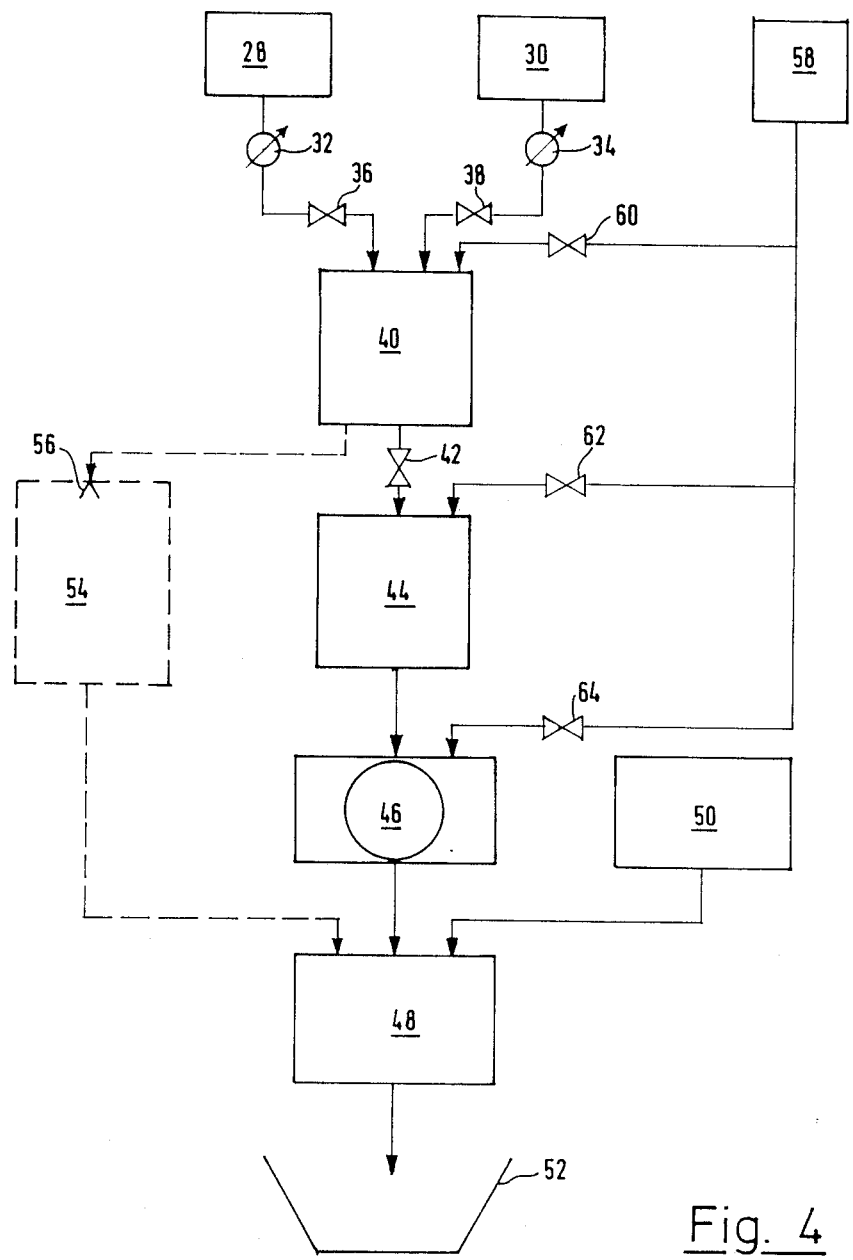

Reference is now made to the drawing for more detailed explanation of the invention. In the drawing:

FIG. 1 is a diagrammatic representation of filler material particles embedded in the traditional manner in a synthetic resin binder;

FIG. 2 is a diagrammatic representation of a homogenous mixture of filler material particles and cooled particles of a reactant synthetic resin with a plurality of components blocked in its reaction, FIG. 3 is a diagrammatic representation of a porous article, of which the filler material particles are connected only by individual plastic bridges in the area of the contact points with the adjacent filler material particles;

FIG. 4 is an installation for the production of a ready-for-use mixture of filler materials and reactant synthetic resin.

In the diagrammatic representation of FIG. 1, with the mixing of liquid synthetic resin binder with filler material, the filler material particles which are numbered from 1 to 12 are wetted on their entire surfaces by liquid synthetic resin and are coated with a sheathing 14. Also, the intermediate spaces 16 between the filler material particles are filled up with synthetic resin. If one proceeds from there with a theoretical calculation that the filler material particles 1 to 12 are essentially spherical, and have a diameter of 0.5 mm, then approximately $8 \cdot 10^6$ particles fit into a liter volume, and the sum of the volumes of particles in turn makes up only approximately one half a liter. Approximately half of the space is therefore occupied by an article according to the diagrammatic representation in FIG. 1 which is first of all liquid, then becomes hardened synthetic resin binder, and on the sheathing 14 approximately 30% and on the intermediate space 16 approximately 20% is wasted.

If the filler material is mixed with a smaller quantity of synthetic resin than corresponds to the calculated portion for filling up all of the hollow spaces, then an inhomogeneity is obtained, dependent upon the viscosity in the articles to be produced, which leads to nonuniform density and varying porosity in the product. Also when the filler material particles are mixed with powdered, cooled synthetic resin in identical quantities as with use of liquid synthetic resin, then the final state as shown in FIG. 1 is obtained, in which the filler material particles are completely or for the most part embedded in synthetic resin.

In comparison, FIG. 2 shows a mixture of filler material particles 1 to 5 with cooled synthetic resin particles 24, blocked in their reaction, which are considerably smaller than the filler material particles 1-5. If the filler material particles have for instance a diameter of 0.5 mm, the diameter of the synthetic resin particles 24 may be for instance approximately 0.01 mm. According to the invention, the total volume of synthetic resin particles 24 makes up only approximately 1-5% of the volume of the filler material particles 18 to 22. Therefore the synthetic resin particles 24 are still surrounded with a sheathing of ice in the original state during the mixing. In the mixed state synthetic resin particles 24, as in FIG. 2, are found in the intermediate spaces between the larger filler material particles 1 to 5. With heating and liquefaction of the ice and of synthetic resin particles 24 then the liquid is drawn by capillary action into the gaps which narrow to the contact points between filler material particles 1 to 12, so that the conditions shown generally in FIG. 3 occur. Then the liquefied reactant synthetic resin is concentrated on the contact points of filler material particles 1 to 12 and there forms synthetic resin bridges 26. Surprisingly, it has been determined that the strength and stability of these bonds over the narrow synthetic resin bridges 26 is almost exactly the same as with all of the filler material particles being surrounded by synthetic resins. The advantage of the bonding as in FIG. 3 resides however in that on account of the intermediate spaces remaining free between filler material particles the plastic otherwise being used for the more or less useless filling up of these hollow spaces can be substantially reduced or eliminated and new products can be obtained with new properties according to the filler material which is used. With use of mineral filler materials, such as for instance sand and the like, high stress resistant lightweight carrier elements or breathing active plates and coatings are obtained. On account of the minimum synthetic resin portion the material is nonflammable or is flammable only with difficulty. The nonuniform outside and inside pores and hollow spaces provide a good sound insulation and heat insulation. For this and for other reasons even plates and coatings produced according to the invention with organic filler material particles, for instance particles of wood, are also suitable.

The greatest possible and most extensive porosity with simultaneous total support of the hard filler material particles one against the other or respectively with very short synthetic resin bridges, as shown in FIG. 3, are what makes the material appear to be particularly suitable for drainage purposes, even if high loads and stresses are to be incorporated therein during such use. Thus on the one hand for instance rainfall can flow rapidly, and on the other hand embedded or stored up plants with their roots find a hold therein and they incorporate and use water sucked in and absorbed from below. Water pipes produced from a material as in FIG. 3 can be used not only for drainage but also for irrigation. It can be basically established that the new material similar to other materials used in construction technology as coatings or layers on the ground, floor, wall or roof is to be applied similar to sealing compound and can be filled or pressed into hollow spaces or can be made into articles of the desired configuration by placement in molds. Normally speaking, only approximately one tenth the quantity of synthetic resin need be used as compared with traditional materials, wherein the filler materials are mixed together in liquid reactant synthetic resin.

The synthetic resins can be treated without problems, since their use is long known to the person in the art. The reactant plastic materials which may be used, especially epoxy resins, but also for instance polyester resins, polyurethane and the like, are designed so that they consist of at least two independent components, which may be stored separately and are stable during storage. When the two components are brought together, then a reaction occurs. If the components are liquid, then after a certain time their aggregate state is changed first into a pasty state and then into the solid phase. The time during which mixed reactant plastics can be treated before they become pasty is called the use time or the pot-life time. Reactant plastics, such as for instance epoxy resins, are produced in various compositions and forms. For instance macromolecular (long chain) systems at room temperature are in solid form. Then reference is made in this case to solid resins. These are either dissolved in solvents, so that they can be brought into contact with the hardener or setting agent, or they are exposed to heat, so that they melt and likewise are thus liquefied.

Short chain reactant plastics are usually in liquid state at room temperature. They are stiff and inflexible at low temperatures, approximately at or near freezing point, and therefore must not be treated below +4 degrees C. With such temepratures and thereunder reactant plastics such as epoxy resins are normally no longer reactant. Below −10 degrees C. to −25 degrees C., liquid resins are normally in solid aggregate state. The possibility therefore exists of blocking, pulverizing and storing admixed and reacted reactant plastics in liquid state simply by change of the temperature obtained by cooling down the reaction which has already begun. This known technology is used in the invention in order with minimum synthetic resin quantities to produce porous articles in the described manner with the relevant desirable properties.

A suitable installation or system for the production of a not yet hardened, ready for use mixture of synthetic resin and filler materials is shown in FIG. 4. The installation which is shown consists first of all of tanks 28 and 30, which contain the synthetic resin components to be used in the reaction. These synthetic resin components are pumped in liquid form by means of dosing pumps 32, 34 through valves 36, 38 into a mixing container 40 and there are thoroughly mixed. With the thorough mixing the reaction of the synthetic resin components is also initiated. However it is interrupted in that the liquid reactant synthetic resin mixture is conducted through a valve 42 into a cooling and solidification chamber 44. The material there is transferred into solid phase, and the block which is formed is fed to a grinder unit 46 and there is comminuted into the desired particle size. The cooled particles could then be very uniformly mixed in a solid mixer 48 with a filler material, such as for instance sand, which is held ready for use in a storage container 50. The complete mixture is held for example in an open container 52 and then filled directly into a mold or spread out on a surface in order to form for instance a street or industrial bedplate coating. Other uses have already been discussed above.

As a preferred alternative to the units 44 and 46, a cooling chamber 54 is shown in broken line in FIG. 4, in which the liquid reactant synthetic resin coming from mixer 40 is conducted through a nozzle 56 into a bath of liquid nitrogen, whereby the required comminution to particle size and the solidification by cooling take place in one single procedure. The advantage of this method resides in that the reactant synthetic resin is cooled more rapidly and more uniformly than otherwise and the grinding procedure can be deleted or can be used simply for further refining of the particles formed during the chilling.

Insofar as is necessary, the container which is polluted with solvent and cleaning fluid may be cleansed following the processing of each charge by the solvent and cleaning fluid which is held in a storage tank 58 and is conducted through valves 60, 62, 64 for example into mixer 40, cooling chamber 44 and grinding device 46.

The process is carried out preferably with quite small container and chamber sizes, and the arrangement shown in FIG. 4 is connected parallel if desired for some plurality of production lines. Each of them can for instance process ten liters of reactant synthetic resin components from tanks 28 and 30 per mixing process in one pass with a cycle time of approximately one minute.

It is to be understood that the process as shown in FIG. 4 is not limited, that subsequent to their production the cooled synthetic resin particles are mixed directly with the filler material which is provided and then processed into the desired porous articles. There is also the possibility that the cooled synthetic resin particles may be stored and mixed with the filler material particles at some later time whenever desired. If also the filler material particles are cooled, which is to be considered especially in the case of small packing sizes, synthetic resin and filler material particles could be mixed in cooled state and then stored in cooled state until use. The mixing can also occur at a later time. Thus for instance cooled epoxy resin granulate or the granulate of some other suitably reactant plastic can be scattered or sprayed onto the rubble of a railroad track bed. The granulate trickles into the intermediate spaces between the stones of the rubble, melts and adheres to the stones of the rubble.

The suggested liquid nitrogen cooling of the reactant synthetic resin components or the mixtures which are produced therefrom according to the invention is accomplished at only quite low cost for the cooling. Therefore it can be recommended in some cases to supply a certain mixture of reactant synthetic resins intended for a construction site or production installation already on site in granular state, cooled with liquid gas. No difficulties are raised in the transport of the cooled material in suitable containers and in thus making the material available.

We claim:

1. A method for the production of a porous product comprising at least one reactant synthetic resin and at least one filler material, said method comprising the steps of:
   producing reactant synthetic resin particles of a temperature below the reaction temperature of the synthetic resin;
   mixing the reactant synthetic resin particles with particles of at least one filler material with the volume of the individual reactant synthetic resin particles being at most approximately one-twentieth of the volume of the individual filler material particles; and
   heating the reactant synthetic resin particles to at least the reaction temperature thereof so as to form a porous product having unfilled spaces in the interstices thereof, and wherein the synthetic resin particles form bridges between discrete contact points or areas on the surfaces of the adjacent particles of filler material.

2. Method as in claim 1 wherein the cooled synthetic resin particles are produced with diameters which at the most are approximately one tenth the size of the largest dimension of the filler material particles.

3. Method as in claim 1 wherein plant seeds and/or plant nutrients are included in the filler materials.

4. Method as in claim 1 wherein said filler material particles include plant nutrients.

5. Method as in claim 1 wherein the heating of said synthetic particles takes place during the mixing step.

6. Method as in claim 1 wherein the heating of said synthetic particles takes place after the mixing step.

7. Method as in claim 1 wherein said synthetic resin is cooled using a cryogenic liquid gas to produce granulation or pulverization thereof by cold shock to form said resin particles.

8. A porous product made by the process of claim 1.

9. A porous product comprising: a plurality of synthetic resin particles and a plurality of filler material particles, said synthetic resin particles, during the formation of the product, having been cooled, as small particles, below the reaction temperature thereof and mixed with the filler material particles in a volume ratio wherein the volume of the synthetic resin particles is at most approximately one twentieth the volume of the individual filler material particles, and having been heated to form within the porous product, synthetic resin bridges between defined contact areas of adjacent filler material particles, and the filler material particles within the porous product being connected to adjacent filler material particles only at the contact areas on the surfaces thereof by means of the synthetic resin bridges, the other areas of the surfaces of the filler material particles being substantially free of said resin and defining therebetween hollow, unfilled spaces within said porous product.

* * * * *